Aug. 16, 1932.  F. L. LESTER  1,871,810
FAUCET CONNECTER FOR FIRE HOSE
Filed Sept. 5, 1931
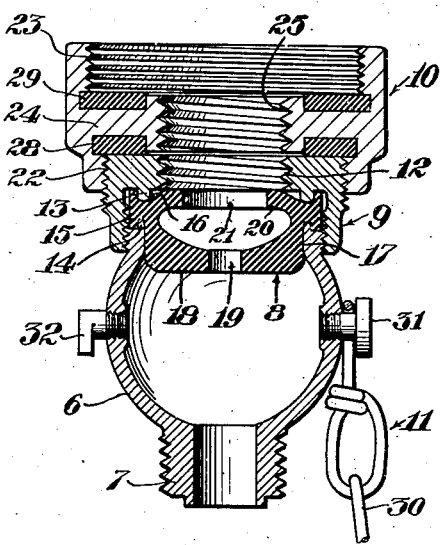
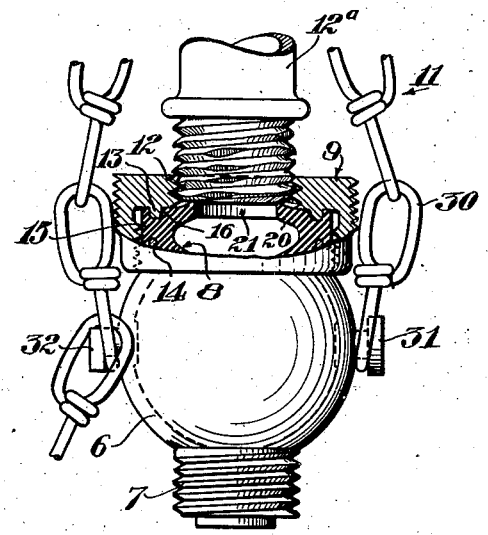
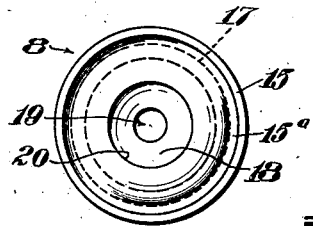
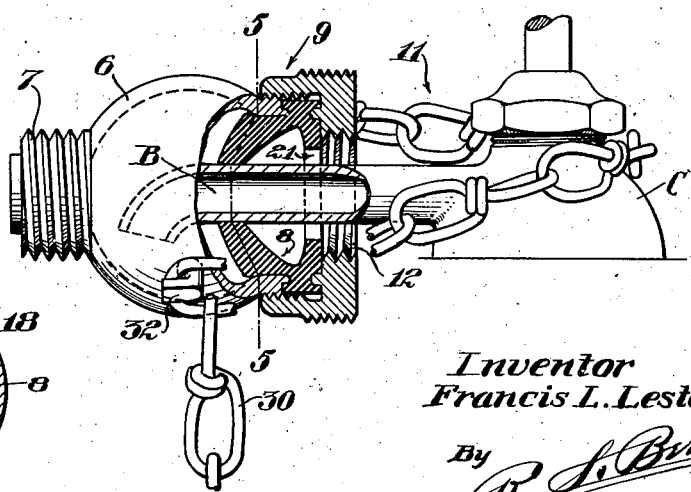
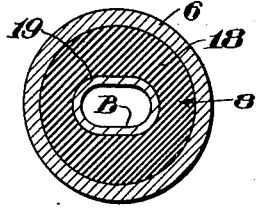
Inventor
Francis L. Lester
By
Att'y.

Patented Aug. 16, 1932

1,871,810

UNITED STATES PATENT OFFICE

FRANCIS L. LESTER, OF LOS ANGELES, CALIFORNIA

FAUCET CONNECTER FOR FIRE HOSE

Application filed September 5, 1931. Serial No. 561,339.

This invention relates to coupling devices for connecting fire and other hose to faucets.

An object of the invention is to provide a connecter of the character described which may be quickly and easily applied to faucets and like outlets having smooth or screw threaded spouts, to provide for and maintain in a particularly efficacious manner a tight and reliable connection of a hose with such faucets.

Another object of this invention is to provide a connecter which as a single, simply constructed, compact and comparatively inexpensive unit may be easily and quickly operated to connect a hose with any of the various types of faucets and outlets usually found in homes, dwellings and office buildings and will maintain a secure connection regardless of the water pressure and other factors tending to break the connection, whereby to facilitate and enhance home and emergency fire prevention and fire extinguishing operation in a particularly advantageous manner.

A further object of this invention is to provide a connecter of the character described, having a novel arrangement and combination of screw threaded coupling members and a rubber coupling gasket, the latter being adapted to hold the connecter in place on smooth faucets of various sizes by friction, whereas the screw threaded members are selectively operable to make connection with threaded faucets of many different sizes under varying space conditions adjacent to the faucets and in such manner as to save time.

Another object is to provide a connecter having a simple, reliable and quick acting detachable means for positively locking the connecter to the faucet.

With the foregoing objects in view, together with such other objects and advantages as may subsequently appear, the invention resides in the parts and in the combination, construction and arrangements of parts hereinafter described and claimed and illustrated by way of example in the accompanying drawing, in which:

Figure 1 is a vertical sectional view of the connecter of this invention;

Figure 2 is a side elevation partly in section, showing the connecter with one of the threaded coupling members removed and the other coupling as when on a threaded faucet;

Figure 3 is a top plan view of the rubber gasket;

Figure 4 is a side elevation partly in section, showing the connecter as when on a smooth faucet;

Figure 5 is a sectional view taken on the plane of line 5—5 of Figure 4.

The present embodiment of the connecter of this invention, as shown in the accompanying drawing, is seen to generally comprise a spherical shell like body 6, an outlet nipple 7 for a hose, not shown, a rubber coupling gasket 8 in said body, a screw threaded coupling member 9 holding said gasket in place and constituting with the latter a means for selectively connecting the body 6 to a smooth or a screw threaded faucet, a detachable screw threaded coupling member 10 for adapting the connecter to threaded faucets of different diameters, and a flexible tie means 11 for anchoring the connecter to the faucet.

The inner or upper open end of the body is externally threaded to receive the coupling 9 which is in the form of a flanged cap having a central screw threaded opening 12 registering with the interior of the body and adapted to accommodate a faucet 12ª, as shown in Figure 2. On opposed surfaces of the coupling 9 and the upper open end of the body are annular flanges 13 and 14 which clamp between them an annular flange 15 formed upon the upper margin of the rubber gasket 8, the flange 15 having annular depressions or recesses 16 in opposed sides thereof to receive said flanges 13 and 14 in such manner that the gasket will be effectively inter-locked with the member 9 and body 6 when the member 9 is screwed tight on said body.

The gasket 8 is cuplike in shape in that it has a cylindrical wall 17 fitting snugly within the open end of the body 6 and a relatively thick bottom portion 18 extending across said end. In this bottom portion is an opening 19 of smaller diameter than the diameter of the spouts of the usual household faucet, but adapted to be stretched to receive and grip such spouts. At its upper end the gasket 8 has a curved wall or flange portion 20 overhanging the bottom portion and disposed to present a large central opening 21 therein, at a point of registry with the opening 12 in the coupling member 9.

The detachable coupling member 10 is internally threaded as at 22 and 23 at both ends and provided with a web portion or cross plate 24 between said ends, then being a central screw threaded opening 25 in said portion 24. The threaded end 22 is adapted to be screwed onto the threaded upper end of the member 9 so that the opening 25 will register with the opening 12, it being noted that these openings are of the same diameter and have matching or continuous screw threads when brought together as aforesaid.

The threaded end 23 of the member 9 is adapted to accommodate the screw threaded spout or outlet, not shown, of a larger faucet or water outlet than may be accommodated by the openings 25 and 12. Between the members 9 and 10 is a washer 28 which is carried by the member 10. A similar washer 29 is carried within the threaded end 23 for engagement with the aforesaid larger sized faucets or outlets.

The tie means 11 may comprise a link chain 30 secured at one end by a fastening 31 to one side of the body 6 and having its other end adapted to be secured on a hook 32 likewise fixed on said body. With the connecter arranged as shown in Figure 1 it is clear that it may be fitted on smooth spout faucets by inserting the spout through the openings 25 and 12 in the couplings 9 and 10 and then through the opening 19 in the rubber gasket 8. If, however, the space accommodations about the faucet and spout or the length of the spout will not permit of the insertion thereof through the gasket opening 19, the member 10 is unscrewed and removed and the spout B of the faucet C may be inserted through the coupling opening 12 and then through the opening 19 of the gasket, as particularly shown in Figure 4. The chain 30 may be looped around the faucet then secured on the hook 32, as shown in Figure 4, to tie the connecter in place. The gasket 8, it will be noted, is of such shape and arrangement that it will securely grip the faucet and maintain the connecter in a particularly reliable manner. The bottom wall of the gasket tapers or inclines towards the opening 19 whereby to provide for guiding the faucet and to facilitate the insertion of the faucet through said opening.

In case the connecter is to be attached to the threaded spout faucet 12ª, shown in figure 2, or one like, the spout may be inserted through the coupling 10 and screwed into the threaded opening 25 thereof or the coupling 10 may be removed and the coupling 9 screwed onto the spout, as shown in Figure 1. In case of a larger screw spout or outlet than the one shown in Figure 2 the threaded end 23 of the coupling 10, as shown in Figure 1, is then employed. It should be noted that the threads of the openings 25 and 12 are oversized whereby to provide for the proper connection even if the threads, as shown on the faucet in Figure 2, are mutilated.

It will now be apparent that the connecter of this invention is capable of being quickly attached to various styles of faucets and outlets and will maintain a secure connection at all times, whereby to facilitate home and emergency fire extinguishing operations in a particularly efficacious manner as well as to permit of an advantageous connection of hose, for various other purposes, to faucets which are ordinarily not adapted for hose connections therewith.

I claim:

1. In a connecter for attaching a hose to a faucet, a hollow body member having an inlet opening and an outlet opening which latter is adapted for connection with a hose, a rubber gasket extending over the intake opening and having a central opening therein adapted to receive the spout of a faucet, and a coupling member on said body and having a screw threaded opening therein arranged in registration with the opening of said gasket and adapted to receive the threaded spout of a faucet.

2. In a connecter for attaching a hose to a faucet, a hollow body member having an inlet opening and an outlet opening which latter is adapted for connection with a hose, a rubber gasket extending over the intake opening and having a central opening therein adapted to receive the spout of a faucet, a coupling member on said body and having a screw threaded opening therein arranged in registration with the opening of said gasket and adapted to receive the threaded spout of a faucet, and another coupling member mounted on the first named coupling.

3. In a connecter for attaching a hose to a faucet, a hollow body member having an inlet opening and an outlet opening which latter is adapted for connection with a hose, a rubber gasket extending over the intake opening and having a central opening therein adapted to receive the spout of a faucet, a coupling member on said body and having a screw threaded opening therein arranged in registration with the opening of said gasket and adapted to receive the threaded spout of a faucet, and another coupling member removably mounted on the first named coupling member.

4. In a connecter for attaching a hose to a faucet, a hollow body member having an inlet opening and an outlet opening which latter is adapted for connection with a hose, a rubber gasket extending over the intake opening and having a central opening therein adapted to receive the spout of a faucet, a coupling member on said body and having a screw threaded opening therein arranged in registration with the opening of said gasket and adapted to receive the threaded spout of a faucet, another coupling member removably mounted on the first named coupling member, and a plate extending across the bore of said second coupling member and having a screw threaded opening therein registering with the threaded opening of the first named coupling member.

5. In a connecter for attaching a hose to a faucet, a hollow body member having an inlet opening and an outlet opening which latter is adapted for connection with a hose, a rubber gasket extending over the intake opening and having a central opening therein adapted to receive the spout of a faucet, a coupling member on said body and having a screw threaded opening therein arranged in registration with the opening of said gasket and adapted to receive the threaded spout of a faucet, another coupling member removably mounted on the first named coupling member, and a plate extending across the bore of said second coupling member and having a screw threaded opening therein registering with the threaded opening of the first named coupling member and being equal in diameter thereto.

6. In a connecter for attaching a hose to a faucet, a hollow body member having an inlet opening and an outlet opening which latter is adapted for connection with a hose, a rubber gasket extending over the intake opening and having a central opening therein adapted to receive the spout of a faucet, a coupling member on said body and having a screw threaded opening therein arranged in registration with the opening of said gasket and adapted to receive the threaded spout of a faucet, and another coupling member removably telescoped upon the first coupling member and having screw threaded bore portions therein of differing diameters.

7. In a connecter for attaching a hose to a faucet, a hollow body member having an inlet opening and an outlet opening which latter is adapted for connection with a hose, a rubber gasket extending over the intake opening and having a central opening therein adapted to receive the spout of a faucet, a coupling member on said body and having a screw threaded opening therein arranged in registration with the opening of said gasket and adapted to receive the threaded spout of a faucet, and another coupling member removably telescoped upon the first coupling member and having screw threaded bore portions therein of differing diameters, one of said threaded bore portions being of the same diameter as and disposed in registration with the threaded opening of the first named coupling member.

8. In a connecter for coupling a hose to a faucet, a body member having a bore therethrough, means at one end of the body member for attaching a hose to the body, a rubber gasket at the other end of said body having an opening therein adapted to receive the spout of a faucet, a member screwed onto said body member, a flange on said gasket having depressions in opposite sides thereof, and opposed flanges on said body member and the screwed on member engaging in said depressions.

9. In a connecter for coupling a hose to a faucet, a body member having a bore therethrough, means at one end of the body member for attaching a hose to the body, a rubber gasket at the other end of said body having an opening therein adapted to receive the spout of a faucet, a member screwed onto said body member, a flange on said gasket having depressions in opposite sides thereof, and opposed flanges on said body member and the screwed on member engaging in said depressions, said screw on member having a screw threaded opening therein registering with and being of greater diameter than the opening in said gasket, and adapted to receive the threaded spout of a faucet or to have a smooth spout inserted therethrough into the opening of said gasket.

FRANCIS L. LESTER.